No. 852,070. PATENTED APR. 30, 1907.
W. E. MARHOFF.
FISHING REEL.
APPLICATION FILED MAY 9, 1904.
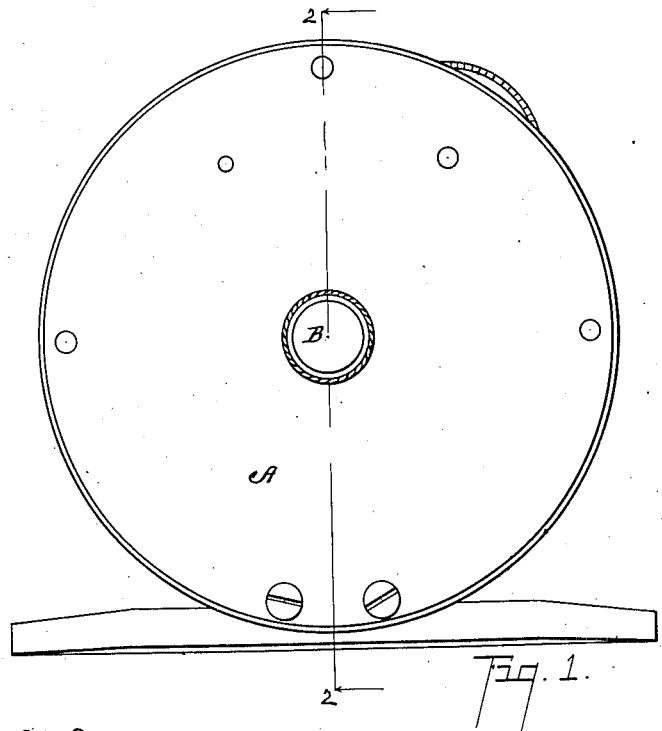
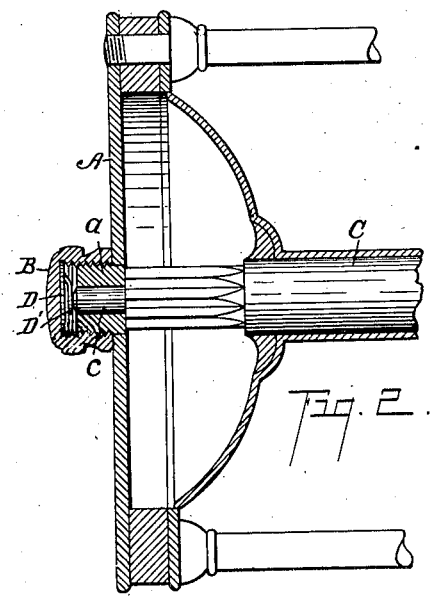
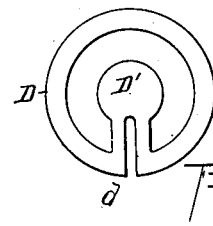
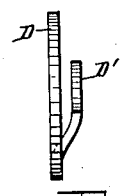
Witnesses:
Inventor,
Walter E. Marhoff
By Fred L. Chappell
Atty.

UNITED STATES PATENT OFFICE.

WALTER E. MARHOFF, OF KALAMAZOO, MICHIGAN, ASSIGNOR TO WILLIAM SHAKESPEARE, JR., OF KALAMAZOO, MICHIGAN.

FISHING-REEL.

No. 852,070.  Specification of Letters Patent.  Patented April 30, 1907.

Application filed May 9, 1904. Serial No. 207,031.

*To all whom it may concern:*

Be it known that I, WALTER E. MARHOFF, a citizen of the United States, residing at the city of Kalamazoo, county of Kalamazoo, State of Michigan, have invented certain new and useful Improvements in Fishing-Reels, of which the following is a specification.

This invention relates to improvements in fishing reels.

The objects of this invention are—First: To provide an improved fishing reel which, although accurate fitting of the parts is not required, is not likely to rattle. Second: To provide an improved fishing reel in which the parts are simply and easily assembled and adjusted, and one which may be satisfactorily assembled and adjusted by an unskilled person. Third: To provide an improved fishing reel which is economical to construct and durable in use.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing forming a part of this specification, in which—

Figure 1 is an end elevation view of a fishing reel embodying the features of my invention. Fig. 2 is a detail sectional view taken on a line corresponding to line 2—2 of Fig. 1, looking in the direction of the little arrows at the end of the section lines, the spool barrel or shaft C being shown in full lines. Fig. 3 is a plan view of one of the end or thrust bearings for the spool journals. Fig. 4 is a side elevation view of the structure shown in Fig. 3.

In the drawing, similar letters of reference refer to similar parts throughout the several views.

Referring to the drawing, the frame heads A of the reel frame are connected by suitable pillars in the usual, or any desired, manner. Projecting centrally from the heads A of the reel are bearing blocks $a$ adapted to receive the journals $c$ of the reel spool. The spool journals $c$ are preferably made integral with the spool barrel C. The bearing blocks $a$ are threaded to receive the internally-threaded caps B, as clearly appears in Fig. 2. The journals of the spool project slightly through the bearings $a$. The journals $c$ are of such a length that the spool, which may be a comparatively loose fit, is capable of some longitudinal movement or adjustment in the bearings.

Arranged within the cap B is a ring D, having an inwardly-projecting spring tongue D' thereon. The tongue D' is preferably integral with the ring and is struck up therefrom, as clearly appears in Figs. 2 and 4, and is adapted to rest against the end of the journal $c$. The ring D is slitted at $d$—see Fig. 3—so that it may be forced into the cap and retains itself, seated therein, by its own tension. The spring tongue D' bearing against the end of the journal $c$, allows the same considerable freedom of movement and, at the same time, prevents its rattling.

As the spring is carried by the threaded cap B, its tension may be regulated by the adjustment of the cap. Thus constructed, the necessity for great accuracy and nicety in the fitting of the journals and spool to the frame is avoided; and, as before stated, rattling of the spool in the frame is prevented, and the same is also kept properly centered so that there is no unnecessary wear upon the parts.

In a reel thus constructed, a free running spool is secured and unnecessary wear and friction of the parts is avoided.

I have illustrated the bearing spring D' for the end of the spool journal in the form preferred by me on account of its simplicity and the ease with which the parts may be assembled and retained in position. I am aware, however, that the same may be greatly modified without departing from my invention.

With the parts arranged as described, an inexperienced person can assemble the reel and adjust the same in a satisfactory manner without liability of causing injury thereto.

I have illustrated and described my invention in the form preferred by me on account of its structural simplicity and economy of production, and durability in use. I am aware, however, that it is capable of very great variation in structural detail without departing from my invention.

Having thus described my invention, what

I claim as new and desire to secure by Letters Patent, is:—

1. In a fishing reel, the combination of a suitable frame; a threaded bearing block projecting from said frame; a spool; a journal therefor projecting through said bearing block; a cap threaded to engage said bearing block; and a ring D having an inwardly-projecting tongue D' thereon, adapted to engage the end of said spool journal, and having a slot $d$ therein arranged within said cap, for the purpose specified.

2. In a fishing reel, the combination of a suitable frame; a threaded bearing block projecting from said frame; a spool; a journal therefor projecting through said bearing block; a cap threaded to engage said bearing block; and a ring having an inwardly-projecting tongue D' thereon adapted to engage the end of said spool journal, arranged within said cap, for the purpose specified.

3. In a fishing reel, the combination of a suitable frame; a spool; a journal or pivot therefor; a suitable journal bearing; a bearing cap; and a spring having a tongue portion adapted to engage said journal and a base portion adapted to engage said bearing cap, for the purpose specified.

4. In a fishing reel, the combination of a suitable frame; a spool; a journal or pivot therefor; a suitable journal bearing; an adjustable bearing cap; and a spring having a tongue portion adapted to engage said journal and a base portion adapted to engage said bearing cap, for the purpose specified.

In witness whereof, I have hereunto set my hand and seal in the presence of two witnesses.

WALTER E. MARHOFF.

Witnesses:
AMELIA J. ALBER,
OTIS A. EARL.